(12) United States Patent
Sakamoto

(10) Patent No.: US 12,315,219 B2
(45) Date of Patent: May 27, 2025

(54) INFORMATION PROCESSING DEVICE, DETERMINATION METHOD, AND NON-TRANSITORY RECORDING MEDIUM

(71) Applicant: Tsuyoshi Sakamoto, Kanagawa (JP)

(72) Inventor: Tsuyoshi Sakamoto, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 577 days.

(21) Appl. No.: 17/547,518

(22) Filed: Dec. 10, 2021

(65) Prior Publication Data

US 2022/0254142 A1 Aug. 11, 2022

(30) Foreign Application Priority Data

Feb. 10, 2021 (JP) ................... 2021-020110

(51) Int. Cl.
*G06K 9/00* (2022.01)
*G06V 10/56* (2022.01)
*G06V 10/74* (2022.01)

(52) U.S. Cl.
CPC ............ *G06V 10/761* (2022.01); *G06V 10/56* (2022.01)

(58) Field of Classification Search
CPC .................. G06V 10/761; G06V 10/56; G06V 30/18105; G06F 16/5838; G06T 7/90; H04N 1/56; H04N 1/60; H04N 1/6008; H04N 2013/0077
See application file for complete search history.

(56) References Cited

U.S. PATENT DOCUMENTS

2014/0314281 A1* 10/2014 Kojima ................. G06T 7/0008
382/112
2021/0256289 A1* 8/2021 Kumagai ............. G06V 10/751

FOREIGN PATENT DOCUMENTS

| JP | 2000-066658 | 3/2000 |
|---|---|---|
| JP | 2010-045676 | 2/2010 |
| JP | 2013-186562 A | 9/2013 |
| JP | 2014-071046 | 4/2014 |
| JP | 2014-154027 A | 8/2014 |
| JP | 2016-046685 | 4/2016 |
| JP | 2021-026614 | 2/2021 |
| JP | 2021-103476 | 7/2021 |

OTHER PUBLICATIONS

Office Action dated Oct. 1, 2024 issued in corresponding Japanese Patent Application No. 2021-020110.

* cited by examiner

*Primary Examiner* — Duy M Dang
(74) *Attorney, Agent, or Firm* — Harness, Dickey & Pierce, P.L.C.

(57) ABSTRACT

An information processing device includes circuitry to generate difference information related to a difference between a first image and a second image. The difference information has a plurality of areas. The circuitry further obtains a total value of differences in each of the plurality of areas as one of a plurality of total area difference amounts and determines whether the first image is same as the second image based on each of the plurality of total area difference amounts.

11 Claims, 17 Drawing Sheets

170

171

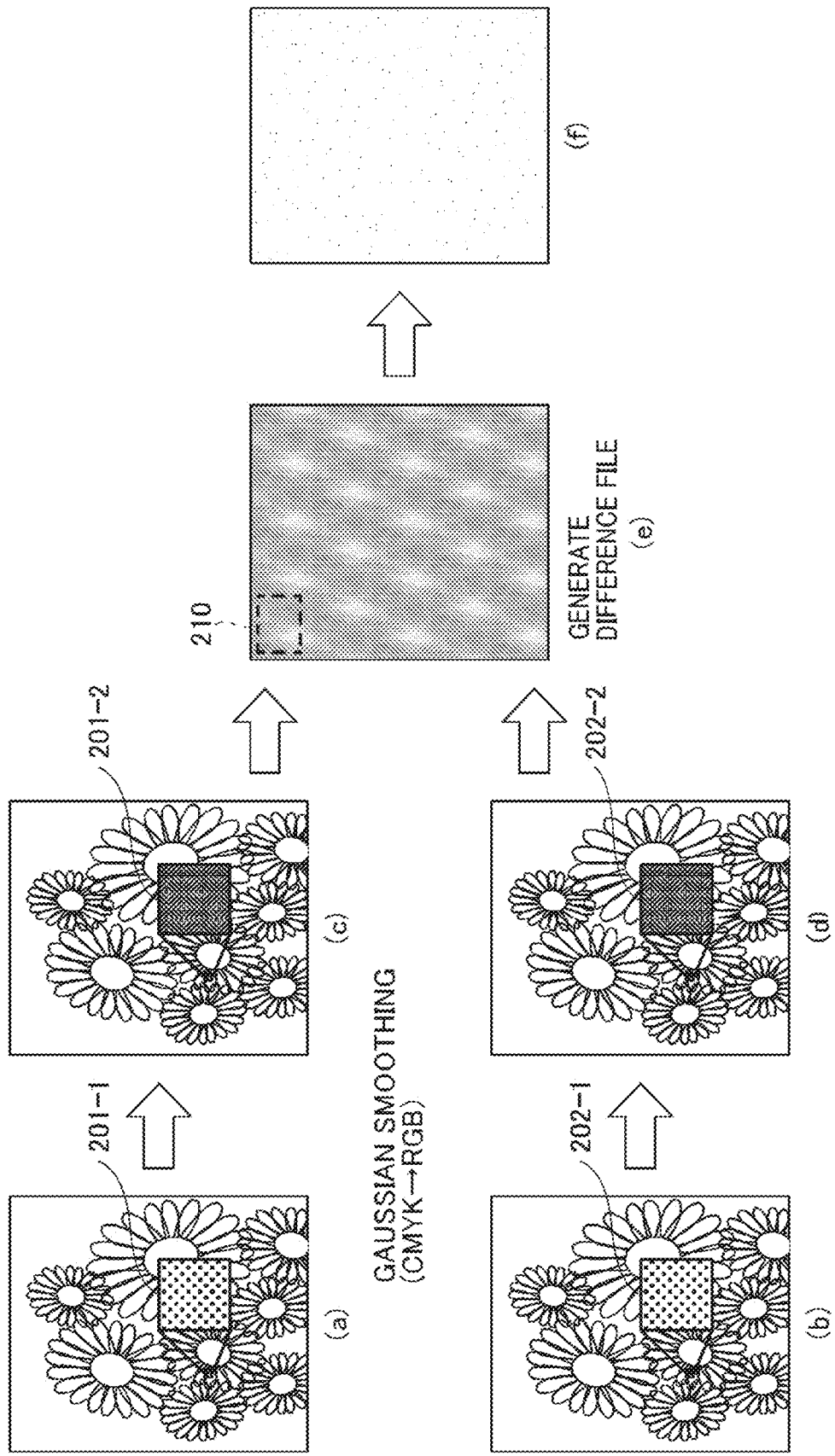

INFORMATION PROCESSING DEVICE, DETERMINATION METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2021-020110, filed on Feb. 10, 2021, in the Japan Patent Office, the entire disclosure of which is hereby incorporated by reference.

BACKGROUND

Technical Field

Embodiments of the present disclosure relate to an information processing device, a determination method, and a non-transitory recording medium.

Related Art

Whether two images are the same with each other or not may be desired to be determined. For example, in a field such as commercial printing in which a high-quality printed matter is desired to be obtained, a user may evaluate regarding whether a printed matter having the same image quality is obtainable after a printer driver is changed due to version upgrade. In addition, in a case of compressing an image, whether the image, Which is before compression and an image obtained by being compressed and having a deteriorated image quality due to the compression are acceptable to be regarded as the same images may be desired to be determined.

As techniques for comparing images, techniques for evaluating quality related to user experience in streaming a video image are known. Methods used in such known techniques include acquiring a quality deterioration index value for an input transcoded video and at least one of a bit rate value of the input transcoded video and a bit rate value of a video that is not transcoded, and estimating the quality related to user experience of the transcoded video based on the acquired values.

SUMMARY

An embodiment of the present disclosure includes an information processing device including circuitry to generate difference information related to a difference between a first image and a second image. The difference information has a plurality of areas. The circuitry further obtains a total value of differences in each of the plurality of areas as one of a plurality of total area difference amounts and determines whether the first image is same as the second image based on each of the plurality of total area difference amounts.

An embodiment of the present disclosure includes a determination method including generating difference information related to a difference between a first image and a second image. The difference information has a plurality of areas. The determination method further includes obtaining a total value of differences in each of the plurality of areas as one of a plurality of total area difference amounts and determining whether the first image is same as the second image based on each of the plurality of total area difference amounts.

An embodiment of the present disclosure includes a non transitory recording medium storing a plurality of instructions which, when executed by one or more processors, causes the processors to perform a method including, generating difference information related to a difference between a first image and a second image. The difference information has a plurality of areas. The method further includes obtaining a total value of differences in each of the plurality of areas as one of a plurality of total area difference amounts and determining whether the first image is same as the second image based on each of the plurality of total area difference amounts.

BRIEF DESCRIPTION OF THE DRAWINGS

A more complete appreciation of the disclosure and many of the attendant advantages and features thereof can be readily obtained and understood from the following detailed description with reference to the accompanying drawings wherein:

FIG. 13 is a diagram illustrating a method of determining for sameness based on a total area difference amount, according to the exemplary embodiment of the present disclosure;

Figure 1A:
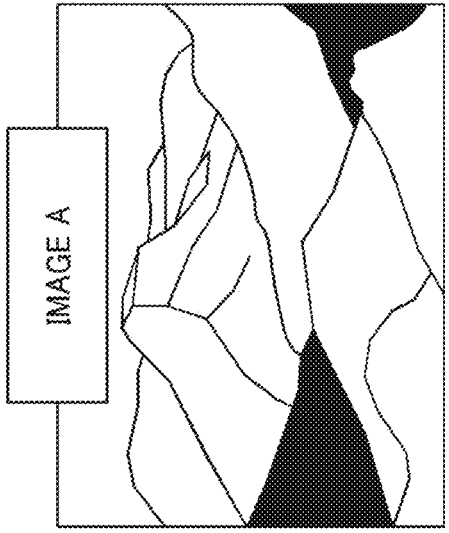
FIG. 1A to FIG. 1F are diagrams illustrating two pairs of images to be compared and difference between two images in each pair, according to an exemplary embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a description is given of an information processing device and a determination method performed by the information processing device according to one or more of the embodiments of the present disclosure, with reference to the drawings.

Sameness Determination Performed by Focusing on Arrangement of Differences:

According to an embodiment of the present disclosure, a determination method that is performed by focusing on an arrangement of differences to determine whether two images are the same is devised in order to obtain a determination result that is closer to one obtained by determination made by humans. In such a sameness determination performed by focusing on an arrangement of differences, the information processing device determines that two or more images are the same with each other when a difference is within a range that is not perceptible with human eyes. Accordingly when pixels, each of which is determined to be perceptible with human eyes, of difference information related to two images are arranged in a manner that the pixels are perceptible with human eyes, it is regarded as a visible difference ("not match" (not the same)). Examples of an arrangement of differences perceptible with human eyes include the following:

(i) The pixels each of which is determined as a difference are continuously arranged to have a size equal to or larger than a size that is perceptible with human eyes.

(ii) The pixels each of which is determined as a difference are arranged to occupy a ratio equal to or greater than a ratio that perceptible with human eyes in a certain area.

(iii) The pixels each of which is determined as a difference are arranged in a specified arrangement pattern.

Overview of Sameness Determination:

The sameness determination method performed by focusing on an arrangement of differences may obtain a determination result, which indicates whether two images are the same, close to one obtained by determination made by humans, in a case that there is a difference in shape between the two images. However, such the sameness determination method performed by focusing on an arrangement of differences may obtain a determination result, which indicates whether two images are the same, different from one obtained by determination made by humans, in a case that there is a difference in hues, or color tone. That is, even when there is no difference perceptible with human eyes regarding an arrangement of differences between the two images, whether the difference between the two images is perceptible with human eyes or not changes depending on content of the images. This means that a determination result same as the one determined by humans may not be obtained by merely focusing on such an arrangement of differences.

With respect to the above-described matter, a description is given with reference to FIG. 1. FIG. 1A to FIG. 1F are diagrams illustrating two pairs of images to be compared and difference between two images in each pair, according to an embodiment of the present disclosure. The two pairs are a first pair and a second pair, and content of image of the first pair is different from that of the second pair FIG. 1A and FIG. 1B are the first pair, and an image A of FIG. 1A and an image B of FIG. 1B are to be compared. FIG. 1D and FIG. 1E are the second pair, and an image D of FIG. 1D and an image E of FIG. 1E are to be compared. FIG. 1C is a diagram illustrating difference C obtained by comparing the image A and the image B in the first pair. FIG. 1F is a diagram illustrating difference F obtained by comparing the image D and the image E in the second pair.

Figure 1B:
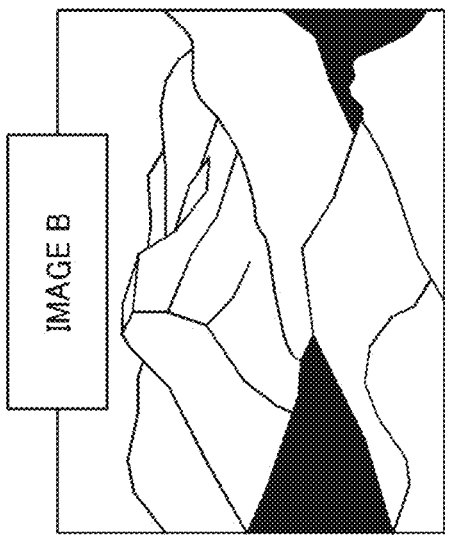
Figure 1C:
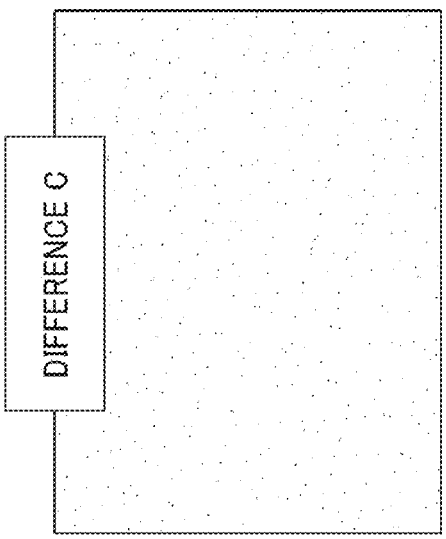
Figure 1D:
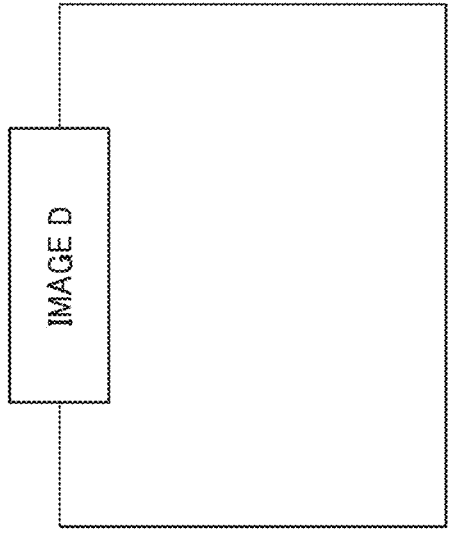
Figure 1E:
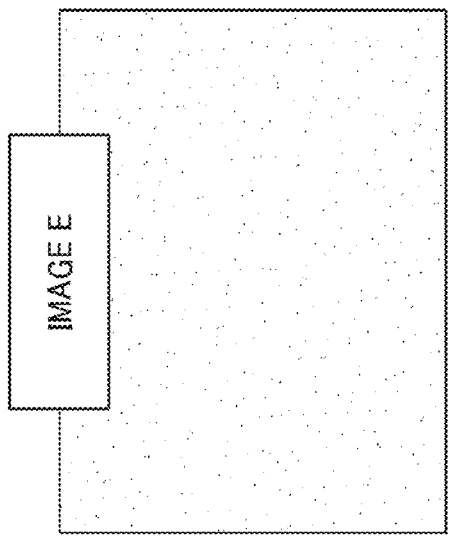
Figure 1F:
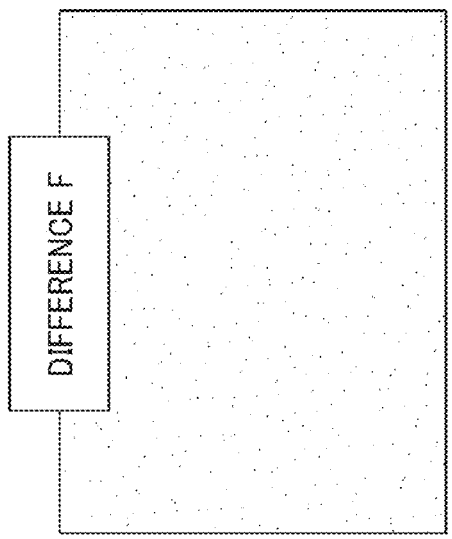

When the image A of FIG. 1A and the image B of FIG. 1B are compared by human visual perception (human eyes), a determination result indicating that no difference is present is obtained. On the other hand, when the image D of FIG. 1D and the image E of FIG. 1E are compared by human visual perception (human eyes), a determination result indicating that there is difference is obtained. However, as illustrated in FIGS. 1C and 1F, the difference C of the first pair and the difference F of the second pair are the same or substantially the same with each other. As described above, even when the arrangement of differences between the two images in an image pair is the same as the one in another image pair, whether the difference between the two images is perceptible with human eyes changes depending on the content of the images That is, in a case where content of the two image is complicated and difference is present as a whole between the two images, the difference is not detected by using the arrangement of differences, and thus the information processing device fails to obtain, regarding the sameness, a determination result same as the one that is obtained by determination made by humans. This mainly applies a case where there is difference in hues, or color tone, between the two images.

In addition, in the sameness determination method performed by focusing on the arrangement of differences, a degree or level of difference between images is not obtained unless the images are visually checked by humans. Due to this, priorities are difficult to be set after an information processing device performs the sameness determination, in a case where there is a large number of differences between the images.

In view of the above, an information processing device according to an exemplary embodiment determines whether the difference is perceptible with human eyes by comparing a total difference amount in the area (hereinafter, referred to as a total area difference amount) in difference information with a threshold value. More specifically, the total area difference amount is calculated, or obtained, tor each of a plurality of areas corresponding to the difference information, and each of a plurality of total area difference amounts total area difference amount is compared with the threshold value for the determination. That is, a determination result indicating whether the two images are the same or not is obtained by determining difference in shape by using an arrangement of differences and determining difference in hues, or color tone, by using the total area difference amount. The determination result obtained by doing so is to be closer to the one obtained by determination made by humans.

Regarding Terms:

In the description of embodiments of the present disclosure, a term of "same" means being identical, or matching, and even when there is a difference, a degree or level of the difference is not perceptible with human eyes. In addition, a term of "different" means being not identical, and that there is a difference that is perceptible with human eyes. "Same" may be referred to as "extremely similar," and "different" may be referred to as "not similar nor the same."

Figure 2A:
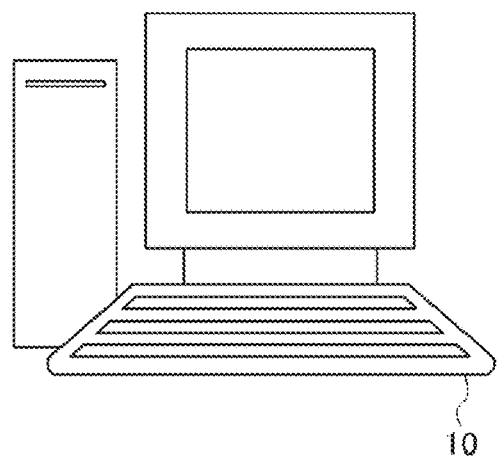
FIG. 2A and FIG. 2B are diagrams illustrating examples of configurations of an information processing device and an information processing system each of which performs a sameness determination, according to the exemplary embodiment of the present disclosure.
Figure 2B:
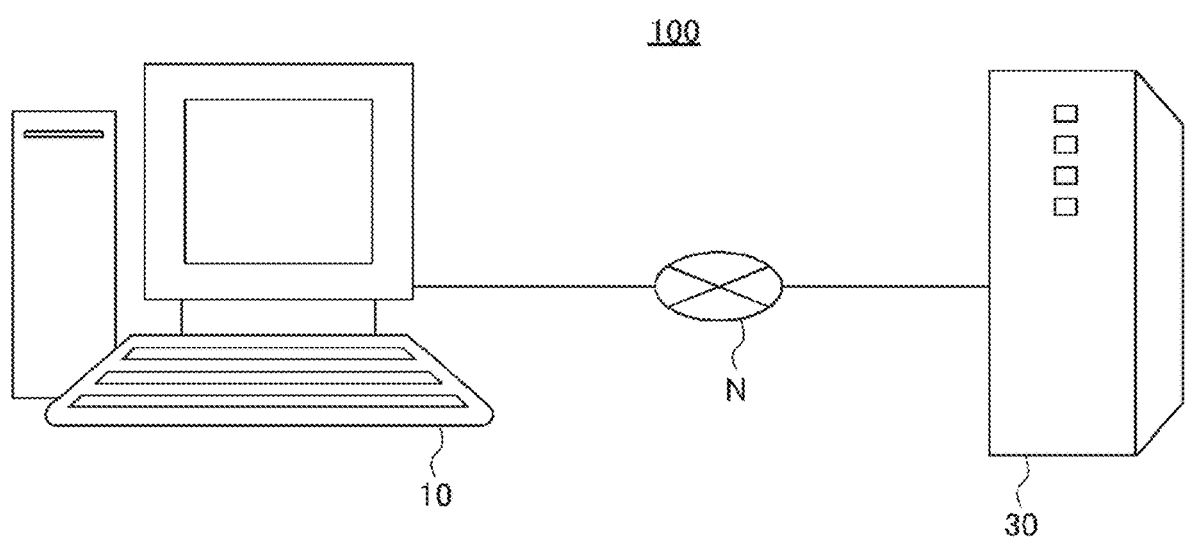

Configuration:

FIG. 2A and FIG. 2B are diagrams illustrating examples of configurations of an information processing device 10 and an information processing system 100 each of which performs the sameness determination, according to an exemplary embodiment. In the example configuration illustrated in FIG. 2A, the information processing device 10 performs the sameness determination, according to the exemplary embodiment. In the example configuration illustrated in FIG. 2B, a server 30 performs the sameness determination, according to the exemplary embodiment. In the system configuration illustrated in FIG. 2A, the information processing device 10 acquires two images stored in a storage unit, performs the sameness determination, and outputs a determination result to be displayed on a display. The determination result may be transmitted by e-mail or stored in the storage unit. The determination result may be stored in the cloud.

The information processing device 10 may be any device on which software is operable. Examples of the information processing device 10 include, for example, a personal computer (PC), a tablet terminal, a Personal Digital Assistant (PDA), and a smartphone.

In the information processing system 100 illustrated in FIG. 2B, the information processing device 10 and the server 30 are communicably connected to each other through a network N. A server is a device that mainly performs information processing on a network and responds to a request received via the network with a processing result.

In the system configuration illustrated in FIG. 2B, the information processing device 10 transmits two or more images to the server 30. The server 30 determines in relation to the sameness between the two or more images and transmits a determination result to the information processing device 10. The determination result may be transmitted by e-mail or stored in the cloud.

The server 30 in the configuration illustrated in FIG. 2B is used as a so-called web server that generates screen information of a portal screen to receive image data and provides the screen information to the information processing device 10. The screen information is described with, such as for example. Hypertext Markup Language (HTML). Extensible Markup Language (XML), script language, or Cascading Style Sheet (CSS), and is mainly analyzed and displayed by browser software. The information processing device 10 on which a web browser is operating receives the screen information and displays a web page, accordingly. The web page has an interface for registering two or more images, which are stored in, or held by, the information processing device 10, and the two or more images are registered according to a user operation performed via the web page and then transmitted to the server 30.

The web page may be provided by using a web application. The "web application" is defined as software or a mechanism of software that is implemented by cooperation between a program executed on a browser and written in a programming language such as JAVASCRIPT (Registered Trademark) and a program provided by a web server. The web application allows information processing devices to dynamically change web pages.

Figure 3:
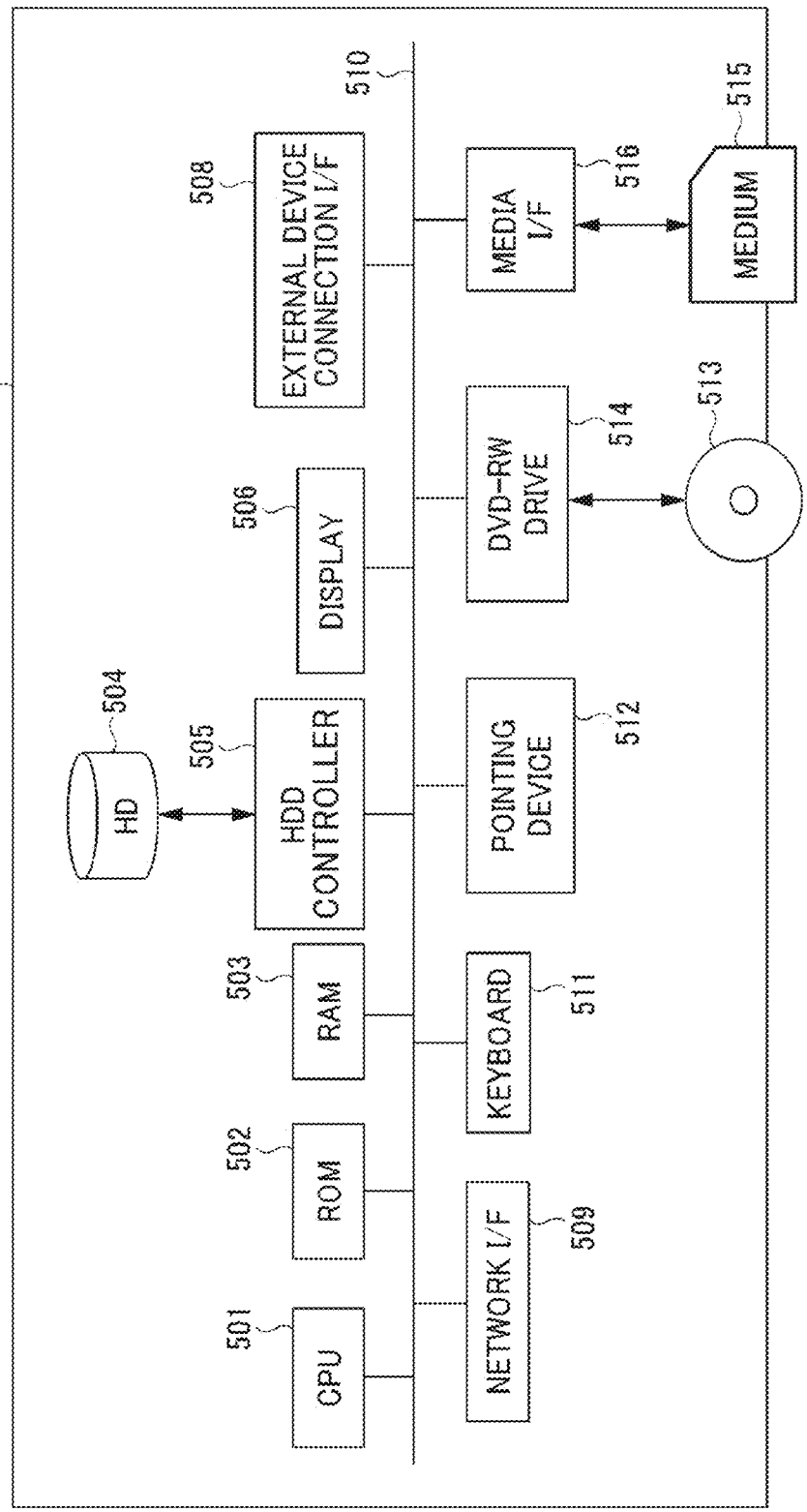
FIG. 3 is a block diagram illustrating an example of a hardware configuration of the information processing device or a server according to the exemplary embodiment of the present disclosure.

Hardware Configuration:

FIG. 3 is a block diagram illustrating an example of a hardware configuration of the information processing device 10 or the server 30 according to the exemplary embodiment of the disclosure. In the following description of the hardware configuration, the information processing device 10 is used as an example to describe the hardware configuration.

As illustrated in FIG. 3, the information processing device 10 is implemented by a computer and includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disk-rewritable (DVD-RW) drive 514, and a media I/F 516.

The CPU 501 performs overall control of the information processing device 10. The ROM 502 stores a program such as an initial program loader (IPL) used for driving the CPU 501. The RAM 503 is used as a work area for the CPU 501. The HD 504 stores various data such as a program. The HDD controller 505 controls reading and writing of various data from and to the HD 504 under control of the CPU 501. The display 506 displays various information such as a cursor, a menu, a window, a character, or an image. The external device connection I/F 508 is an interface for connecting to various external devices. Examples of the external devices include, but are not limited to, a universal serial bus (USB) memory and a printer. The network I/F 509 is an interface for performing data communication using a communication network. The bus line 510 is an address bus, a data bus, or the like for electrically connecting the components such as the CPU 501 illustrated in FIG. 3 each other.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The DVD-RW may be an optical storage medium such as a DVD-Recordable (DVD-R). The media I/F 516 controls reading and writing (storing) of data from and to a storage medium 515 such as a flash memory.

Figure 4:
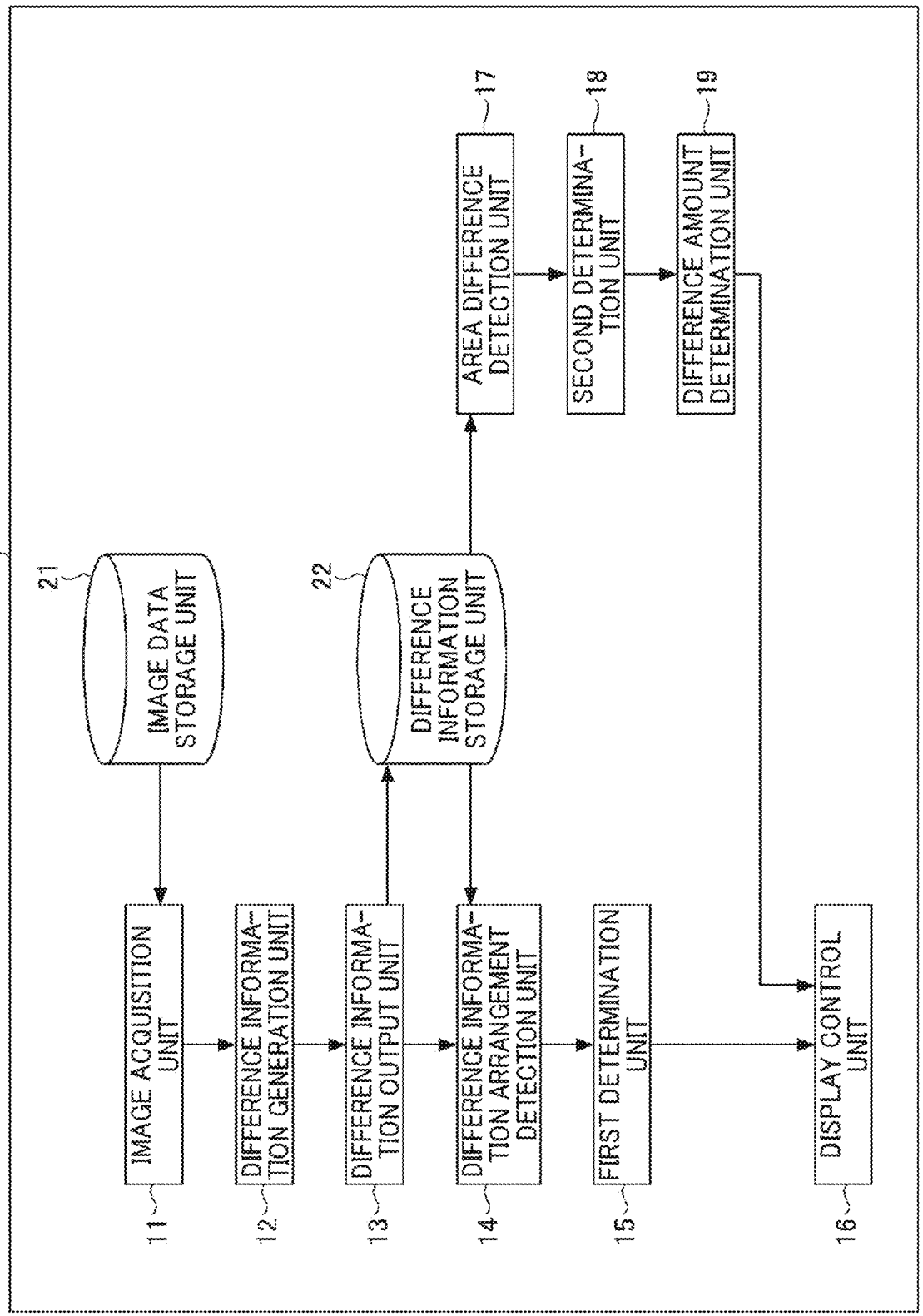
FIG. 4 is a block diagram illustrating an example of a functional configuration of the information processing device according to the exemplary embodiment of the present disclosure.

Functions:

FIG. 4 is a block diagram illustrating an example of a functional configuration of the information processing device 10 according to the present embodiment of the disclosure. In FIG. 4, description is given assuming the functions of the information processing device 10 unless otherwise specified. The functions included in the server 30 may be substantially the same as those of the information processing device 10, except for that the server 30 further includes a communication unit.

The information processing device 10 includes an image acquisition unit 11, a difference information generation unit 12, a difference information output unit 13, a difference information arrangement detection unit 14, a first determination unit 15, a display control unit 16, an area difference detection unit 17, a second determination unit 18, and a difference amount determination unit 19. Each functional unit included in the information processing device 10 is implemented by operating any of components illustrated in FIG. 3 according to an instruction from the CPU 501 according to a program expanded from the HD 504 to the RAM 503.

The image acquisition unit 11 acquires (reads) data corresponding to two or more images stored in the image data storage unit 21. Hereinafter, in the description of the present embodiment the data may be referred to as image data. The two or more images are mentioned above, because there may be a ease two images selected from three images are compared, for example. The images to be acquired may be selected by a user. Alternatively, the images may be sequentially acquired from the image data storage unit 21.

The difference information generation unit 12 generates difference information related to two images to be compared with each other. The difference information generation unit 12 generates the difference information by determining whether the same pixel (Cyan, Magenta, Yellow, and Black (CMYK)) presents or not at each of the pixel positions defined by resolution of the image. With respect to images each of which is based on Red, Green and Blue, so-called RGB images, the difference information generation unit 12 calculates, for each of the pixel positions according to resolution, a value in relation to difference for each of Red, Green, and Blue (each of the Red, the Green, and the Blue, each of the RGB). In case of RGB images, a value range of −255 to 255 (in a case of 8 bits per pixel) is used in relation to the difference for each of Red, Green, and Blue.

The difference information output unit 13 stores the difference information generated by the difference information generation unit 12 in the difference information storage unit 22. The difference information is two dimensional information having the same resolution (size) as the image.

The difference information arrangement detection unit 14 detects an arrangement of differences. Although details will be described later, continuous differences (continuously arranged differences), a ratio (difference ratio) within a certain area, and a predetermined pattern (difference pattern) are detected from the difference information.

The first determination unit 15 determines, based on an arrangement of differences detected by the difference information arrangement detection unit 14, whether the arrangement of differences is perceptible with human eyes or not. The arrangement of differences that is perceptible with human eyes has a value equal to or greater than a threshold value indicating that a difference is perceptible with human eyes. The threshold value is determined according to whether a difference between two images is determinable to be present with the human visual perception. When there is a difference that is perceptible with human eyes, a determination result indicates that the two images are not the same with each other, and when there is no difference that is perceptible with human eyes, a determination result indicates that the two images are the same with each other. In other words, whether a value corresponding to the continuous differences or a value corresponding to the ratio within a certain area is equal to or greater than the threshold value, which indicates that a difference is perceptible with human eyes is determined. When the predetermined pattern is detected, the first determination unit 15 determines that the two images are not the same with each other. These three determination criteria may be employed in two or more of ANDs or ORs.

The area difference detection unit 17 calculates a total area difference amount in the difference information generated by the difference information generation unit 12. The area difference detection unit 17 calculates a total area difference amount for each of a plurality of areas corresponding to the entire difference information (the entire two dimensional image) while moving one to another of the plurality of areas.

The second determination unit 18 determines whether each total area difference amount is equal to or greater than the threshold value. When there is at least one area of which the total area difference amount is equal to or greater than the threshold value, the second determination unit 18 determines that the two images are not the same with each other.

The difference amount determination unit 19 determines how much the total area difference amount exceeds the threshold value. The greater the total area difference amount exceeds the threshold value, the easier the difference is noticed by humans.

The display control unit 16 displays an arrangement of differences and a total area difference amount on the display 506 in an emphasized manner.

Figure 5:
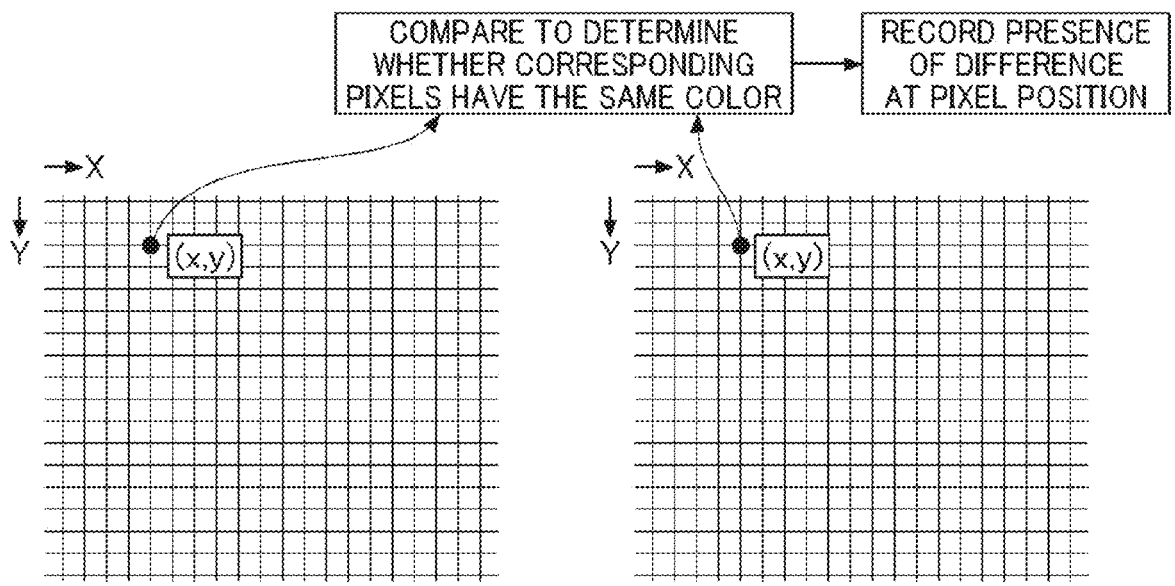
FIG. 5 is a diagram illustrating a method of generating difference information related to CMYK images by a difference information generation unit according to the exemplary embodiment of the present disclosure.

Generating Difference Information from CMYK Images:

FIG. 5 is a diagram illustrating a method of generating the difference information related to CMYK images by the difference information generation unit 12, according to the present embodiment of the disclosure. In FIG. 5, a part of each of two images to be compared with each other is enlarged and illustrated. The difference information generation unit 12 determines whether there is a difference between the images for each of the pixel positions that are determined according to resolution of the image (for example, in a case of an image having the resolution of 1980×1280, the vertical is equally divided into 1980 and the horizontal is equally divided into 1280). In the example of FIG. 5, intersection points of the mesh are the pixel positions.

When corresponding pixels at the same pixel positions in the two images have the same color, a determination indicates that there is no difference between the images. On the other hand, when corresponding pixels at the same pixel positions in the two images does not have the same color, a determination indicates that there is a difference. The difference information generation unit 12 sets a flag at a pixel position that has a difference. When the difference information is represented by an image, a dot is placed at a pixel position where the flag is set. For example, the difference information generation unit 12 prepares a table having records of which the number is corresponding to the number of pixel positions and records "presence or absence of flag."

Alternatively, the difference information generation unit 12 may use a value corresponding to a degree or a level of the difference as the difference information. For example, it is assumed that there are the following differences in pixel positions between one image data and the other image data.

A (C: presence, K: presence)
B (C: presence, Y: presence)
C (C: presence, none)
D (C: presence, M: presence)

In this case, the level of the difference is considered to be larger in an order of A<B<C<D. That is, the difference information generation unit 12 sets values to be A<B<C<D (to be bigger in the order of D, C, B, and A) in the table.

Alternatively, the difference information generation unit 12 may combine one or more pixels with another one or more pixels in each image to calculate a feature amount, and then compare the feature amounts. For example, pixels around a pixel position are weighted by Gaussian smoothing or the like, and a difference between weighted values is recorded in the table. Alternatively, when there is a difference larger than the threshold value, the presence of difference (flag) is recorded in the table.

Arrangement of Differences:

The arrangement of differences is described below.

A description is given below of (i): The pixels each of which is determined to be as a difference are continuously arranged to be equal to or larger than a size that is perceptible with human eyes.

The difference information arrangement detection unit 14 scans the pixel positions in a sequential order and detects continuous differences.

Figure 6A:
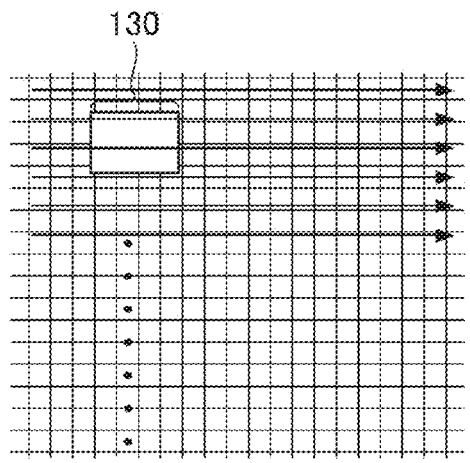
FIG. 6A and FIG. 6B are diagrams illustrating a method of detecting differences that are continuously arranged to have a size equal to or larger than a size that is perceptible with human eyes, according to the exemplary embodiment of the present disclosure.
Figure 6B:
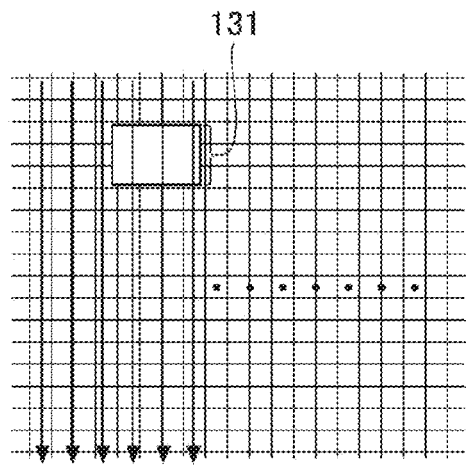

FIG. 6A and FIG. 6B are diagrams illustrating a method of detecting differences that are continuously arranged to have a size equal to or larger than a size that is perceptible with human eyes, according to the present embodiment of the disclosure. In FIG. 6A, the difference information arrangement detection unit 14 scans the pixel positions in the horizontal direction. Accordingly, when there is a difference equal to or larger than a difference 130 that has a size that is perceptible with human eyes, in the horizontal direction, the difference is detectable.

In FIG. 6B, the difference information arrangement detection unit 14 scans pixel positions in the vertical direction. Accordingly, when there is a difference (a set of continuous differences, continuous differences) equal to or larger than a difference 131 that has a size that is perceptible with human eyes, in the horizontal direction, the difference is detectable.

The arrangement of differences of a rectangular shape is detected by scanning in the vertical direction and in the horizontal direction, as illustrated in FIG. 6A and FIG. 6B, respectively. The difference information arrangement detection unit 14 detects a length of differences continuously arranged (a length of continuous differences) in each of the vertical direction and horizontal direction. Note that the difference information arrangement detection unit 14 may also scan in an oblique direction.

Then, the first determination unit 15 compares the length of differences continuously arranged with a predetermined length (threshold value), and when the length of differences continuously arranged is longer than the predetermined length, records at the pixel positions corresponding to the differences continuously arranged to indicate that the length is longer than the predetermined length. For example, the difference information arrangement detection unit 14 prepares a table that has records of which the number is corresponding to the number of pixel positions and records "presence of difference" for each of the pixel positions corresponding to the differences continuously arranged to have the length longer than the predetermined length.

Accordingly, the display control unit 16 of the information processing device 10 may display the corresponding pixels in an emphasized manner, and this allows the user to notice the arrangement of differences easily.

In the present embodiment, the predetermined length (threshold value) may be set to a certain value used for all images.

A description is given below of (ii): The pixels each of which is determined as a difference are arranged to occupy a ratio equal to or greater than a ratio that is perceptible with human eyes in a certain area.

In this case, the difference information arrangement detection unit 14 sequentially moves a window that encloses pixel positions on the difference information, and determines whether there is a set of differences, which are pixels (pixel positions) each of which is determined as a difference, occupying a ratio greater than the ratio that is perceptible with human eyes within the window or not. A size of the window corresponds to the certain area.

Figure 7:
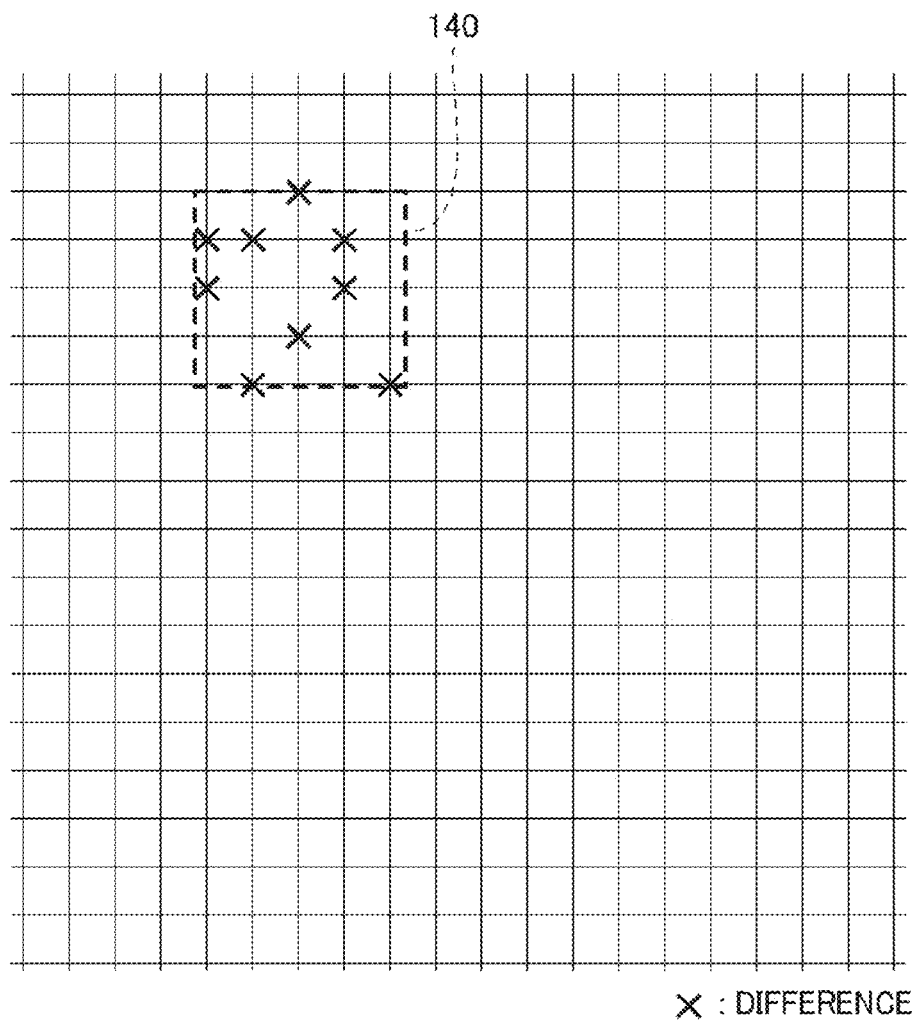
FIG. 7 is a diagram illustrating a method of detecting a set of differences that occupies, in a certain area, a ratio equal to or greater than a ratio that is perceptible with human eyes, according to the exemplary embodiment of the present disclosure.

FIG. 7 is a diagram illustrating a method of detecting a set of differences that occupies a ratio greater than the ratio that is perceptible with human eyes in a certain area, according to the present embodiment of the disclosure. In the example of FIG. 7, a window 140 having 4×4 pixels is illustrated, but the size of the window 140 is an example and not the limiting. The window 140 moves in a manner that a pixel position at the center of the window 140 starts from at a corner of the upper left and moves to the right end pixel by pixel. Then, after being at the right end, the window 140 moves down by one pixel row, and then returns to the left in the same manner, for example. Such the above-described movement is repeated until the pixel position at the center comes to the lower right corner.

The window 140 having 4×4 pixels includes 5×5=25 pixel positions. The difference information arrangement detection unit 14 counts the number of pixel positions each of which is determined as a difference within the window. In FIG. 7, for the sake of explanatory convenience, nine pixel positions are illustrated as being determined as the differences.

The first determination unit 15 determines whether a condition of "9/25>a predetermined ratio" is satisfied or not and when the condition is satisfied, the first determination unit 15 records, in a table, which has records of which the number is corresponding to the number of pixel positions, "presence of difference" for each of the pixel positions corresponding to the nine pixel positions in the window. Accordingly, the display control unit 16 of the information processing device 19 may display the corresponding pixels in an emphasized manner, and this allows the user to notice the arrangement of differences easily.

In the present embodiment the predetermined ratio (threshold value) may be set to a certain value used for all images.

A description is given below of (iii): The pixels each of which is determined as a difference are arranged in a specified arrangement pattern.

In this case, the difference information arrangement detection unit 14 holds a specified arrangement pattern. The difference information arrangement detection unit 14 performs pattern matching on the difference information using an arrangement pattern, and determines whether there is an arrangement of differences that matches the arrangement pattern.

Figure 8A:
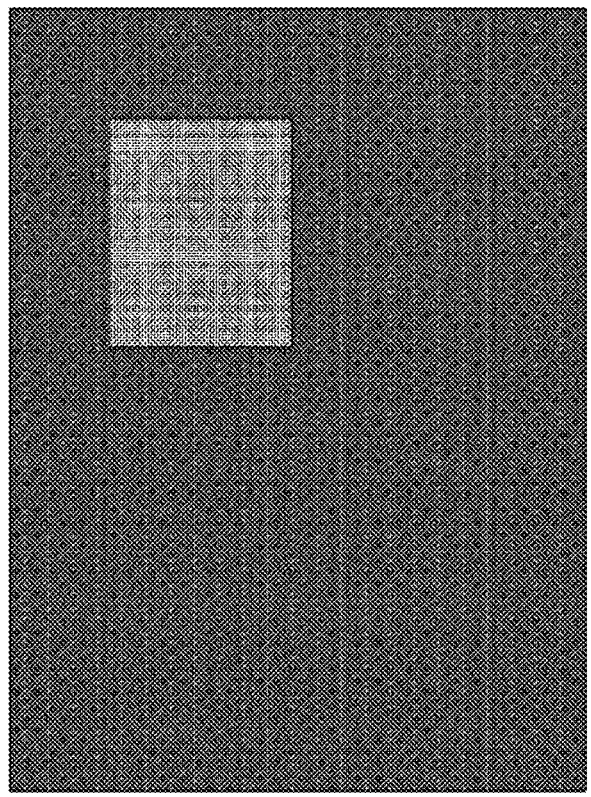
FIG. 8A and FIG. 8B are diagrams illustrating a method of generating difference information, according to the exemplary embodiment of the present disclosure.
Figure 8B:
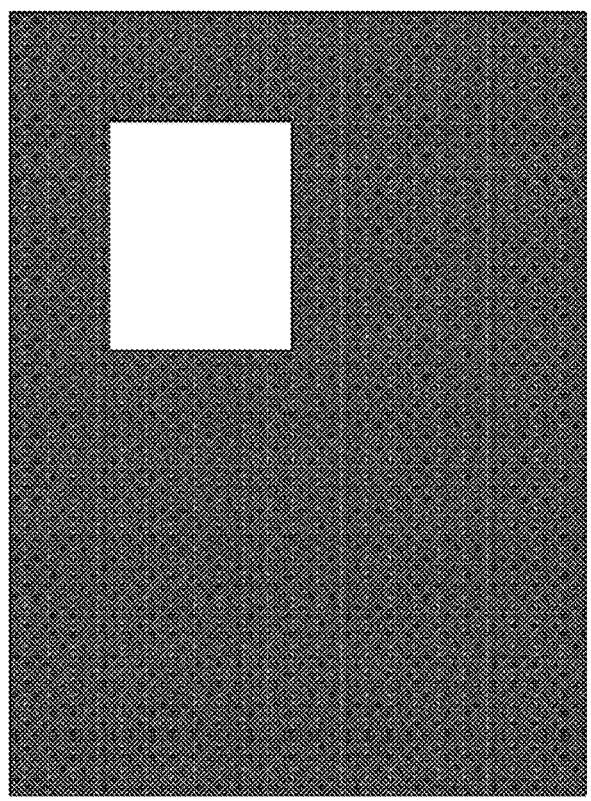

FIG. 8A and FIG. 8B are diagrams illustrating a method of generating difference information, according to the present embodiment of the disclosure. FIG. 8A is a diagram illustrating an example of a first image for comparison (may be referred to as a reference image), and FIG. 9B is a diagram illustrating an example of a second image for comparison (may be referred to as a comparison image). In FIG. 8A and FIG. 8B, the reference image and the comparison image illustrated are clearly different from each other, for the sake of explanatory convenience, however, there is a case where a difference between a reference image and a comparison image is not perceptible with human eyes.

Figure 9A:
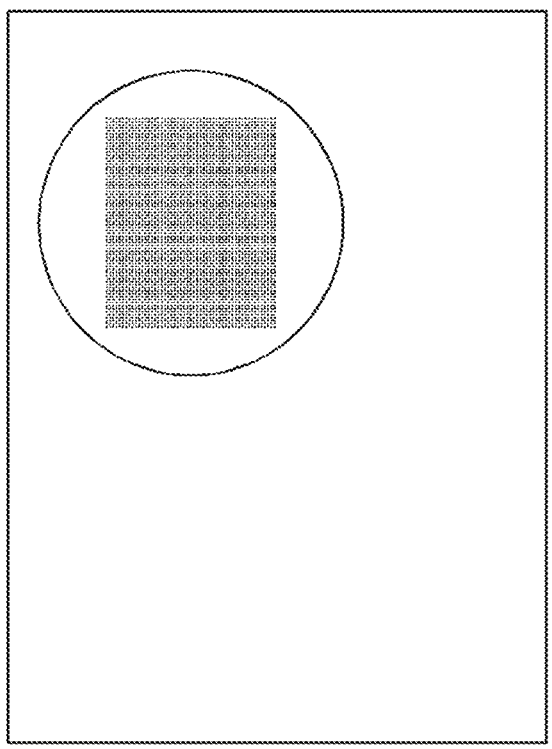
FIG. 9A is a diagram illustrating difference information indicating a difference between a reference image and a comparison image of FIG. 8A and FIG. 8B, according to the exemplary embodiment of the present disclosure.
Figure 9B:
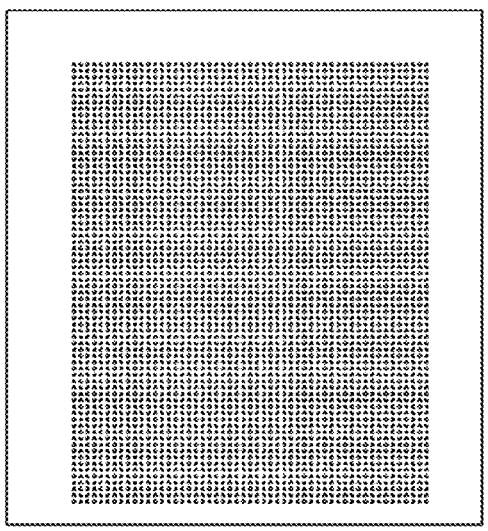
FIG. 9B is an enlarged view of a part of the difference information of FIG. 9A, according to the exemplary embodiment of the present disclosure.
Figure 9C:
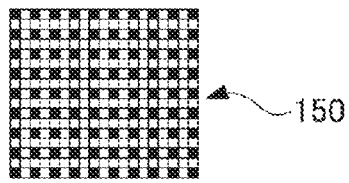
FIG. 9C is a diagram illustrating an example of an arrangement pattern, according to the exemplary embodiment of the present disclosure.

FIG. 9A is a diagram illustrating difference information indicating a difference between the reference image and the comparison image of FIG. 8A and FIG. 8B, according to the present embodiment of the disclosure. FIG. 9B is an enlarged view of a part of the difference information of FIG. 9A, according to the present embodiment of the disclosure. FIG. 9C is a diagram illustrating an arrangement pattern 150, according to the present embodiment of the disclosure. The arrangement pattern 150 is generated in advance as a difference pattern that is easily perceived by human eyes (perceptible with human eyes). The arrangement pattern 150 illustrated in FIG. 9C is an example. In some embodiments, the arrangement pattern is a band shape, a circular shape, or a geometrical pattern, for example.

In a case where the difference illustrated as the enlarged view of FIG. 9B matches the arrangement pattern 150, the difference information arrangement detection unit 14 determines that there is a difference between the two images, and the difference between the two images is detected as being perceived by human. Alternatively, when the difference information arrangement detection unit 14 determines that there is a difference between the two images based on the arrangement pattern 150, the difference between the two images is detected as being perceived by human.

Figure 10:
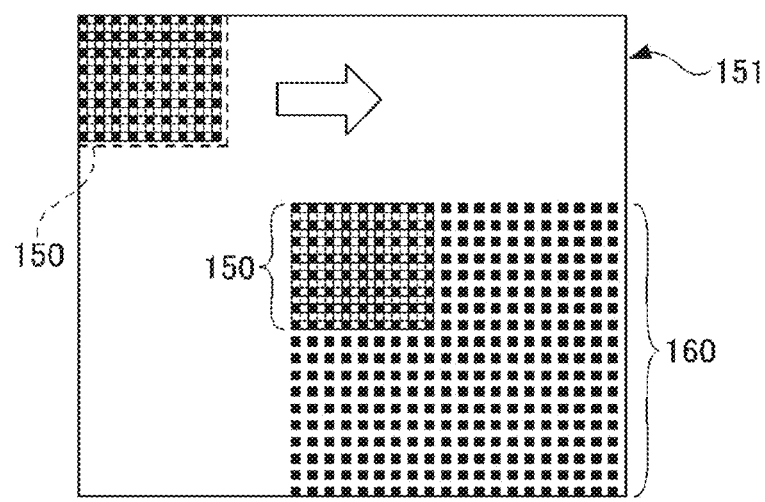
FIG. 10 is a diagram illustrating a method of detecting an arrangement pattern from an arrangement of differences, according to the exemplary embodiment of the present disclosure.

FIG. 10 is a diagram illustrating a method of detecting an arrangement pattern from an arrangement of differences 160, according to the present embodiment of the present disclosure. In FIG. 10, for the sake of explanatory convenience, the arrangement of differences 160 has the same pattern as the arrangement pattern 150. The difference information arrangement detection unit 14 moves the arrangement pattern 150 starting from at a corner of the upper left on difference information 151 and moves to the right end pixel by pixel. Then, after being at the rigid end, the arrangement pattern 150 moves down by one pixel raw, and then returns to the left in the same manner, for example. The difference information arrangement detection unit 14 repeats such the above-described movement until the arrangement pattern 150 reaches the lower right corner.

The difference information arrangement detection unit 14 determines whether "presence of difference" is recorded with respect to the difference information at the same position as each of the pixels of the arrangement pattern 150, and when the "presence of difference" is recorded at each position of all pixels corresponding to the arrangement pattern 150, the arrangement pattern 150 is determined as being detected from the difference information 151. Alternatively, when the "presence of difference" is recorded at each position of a certain number or more (a certain percentage or more) of the pixels corresponding to the arrangement pattern 150, the arrangement pattern 150 is determined as being detected from the difference information 151.

In FIG. 10, there is the arrangement of differences 160 that matches the arrangement pattern 150 in the lower right of the difference information 151, and the arrangement of differences 160 is to be detected by the difference information arrangement detection unit 14.

The difference information arrangement detection unit 14 records, in a table, which has records of which the number is corresponding to the number of pixel positions, the "presence of difference" for each of the pixel positions included in an arrangement pattern that matches the arrangement pattern 150. Accordingly, the display control unit 16 of the information processing device 10 may display the corresponding pixels in an emphasized manner, and this allows the user to notice the arrangement of differences easily.

Display Example of Arrangement of Differences:

With reference to FIG. 11A to FIG. 11C and FIG. 12A to FIG. 12C, a case where the arrangement of differences is detected and another case where the arrangement of differences is not detected are compared and described.

Figure 11A:
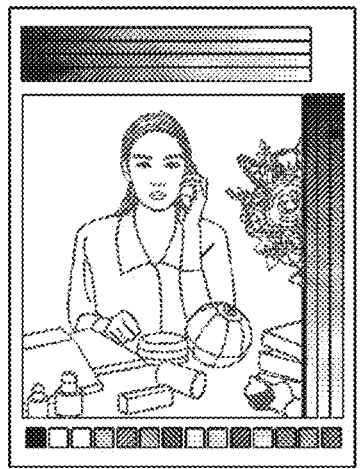
FIG. 11A and FIG. 11B are diagrams illustrating two images between which no arrangement of differences is detected according to the exemplary embodiment of the present disclosure.
Figure 11B:
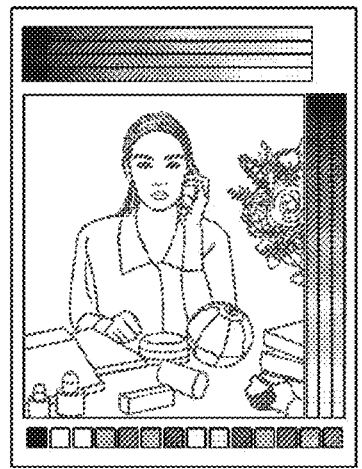
Figure 11C:
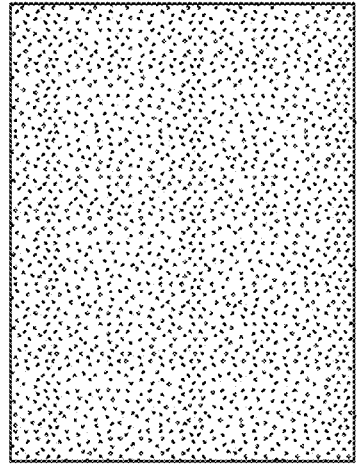
FIG. 11C is a diagram illustrating difference information related to the two images illustrated in FIG. 11A and FIG. 11B, according to the exemplary embodiment of the present disclosure.

FIG. 11A and FIG. 11B are diagrams illustrating two images between which no arrangement of differences is detected, and FIG. 11C is a diagram illustrating difference information related to the two images illustrated in FIG. 11A and FIG. 11B, according to the present embodiment. FIG. 11A is a diagram illustrating an example of a reference image, FIG. 11B is a diagram illustrating an example of a comparison image that is compressed by Joint Photographic Experts Group (JPEG), and FIG. 11C is a diagram illustrating an example of difference information, according to the present embodiment of the disclosure. Although an image of Cyan, Magenta, Yellow, and Black, a so-called CMYK image, is used with respect to the images illustrated in FIG. 11A, FIG. 11B, and FIG. 11C, the RGB images are also applicable.

There is no difference between the two images illustrated in FIG. 11A and FIG. 11B when being viewed by humans (perceived by human eyes). However as illustrated in the difference information illustrated in FIG. 11C, there is difference like noise as a whole. In a conventional technique, there may be a case that the noise is detected as the difference between the two images, and an information processing device according to the conventional technique determines that the two images are not the same.

In the present embodiment, the information processing device 10 does not detect the arrangement of differences on the difference information and determines that the two images of FIG. 11A and FIG. 11B are the same.

Figure 12A:
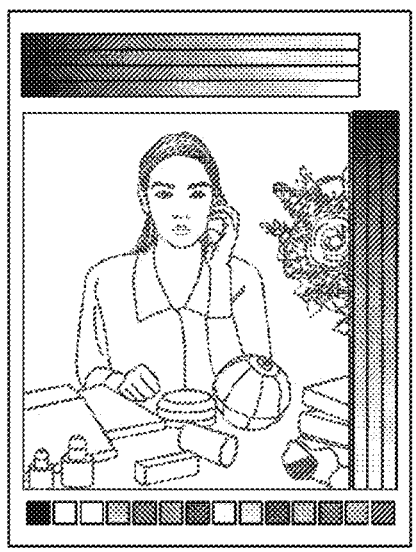
FIG. 12A and FIG. 12B are diagrams illustrating two images between which an arrangement of differences is detected, according to the exemplary embodiment of the present disclosure.
Figure 12B:
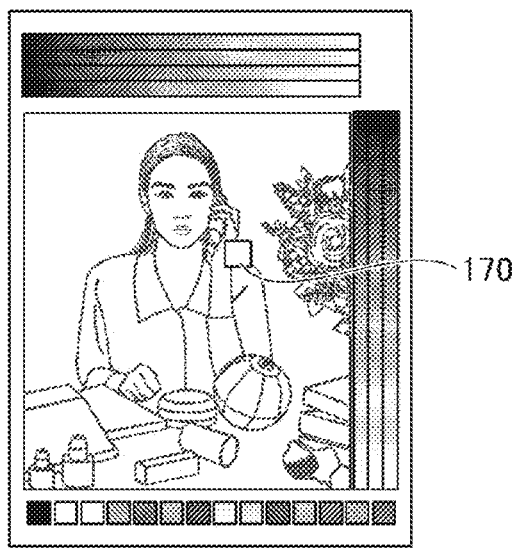
Figure 12C:
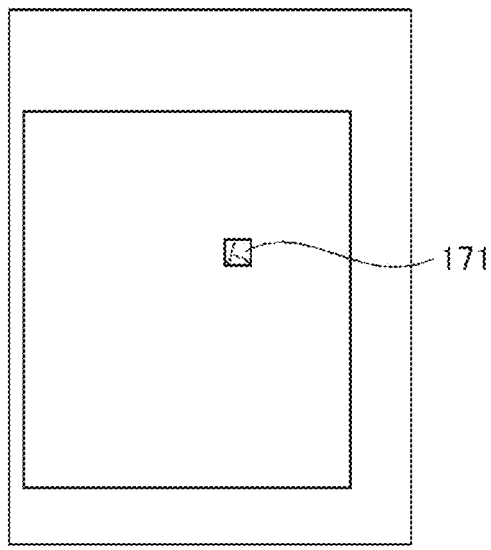
FIG. 12C is a diagram illustrating difference information related to the two images illustrated in FIG. 12A and FIG. 12B, according to the exemplary embodiment of the present disclosure.

FIG. 12A and FIG. 12B are diagrams illustrating two images between which an arrangement of differences is detected, and FIG. 12C is a diagram illustrating the difference information related to the two images illustrated in FIG. 12A and FIG. 12B, according to the present embodiment. FIG. 12A is a diagram illustrating an example of a reference image, FIG. 12B is a diagram illustrating an example of a comparison image to which a white rectangle 170 is added, and FIG. 12C is a diagram illustrating an example of difference information, according to the present embodiment of the disclosure. Although a CMYK image is used with respect to the images illustrated in FIG. 12A, FIG. 12B, and FIG. 12C, the RGB images are also applicable.

With the human visual perception, a difference is clearly noticed between the two images illustrated in FIG. 12A and FIG. 12B. In the difference information illustrated in FIG. 12C, a difference arrangement (arrangement of differences) 171 is detected at the same pixel positions as the white rectangle 170 in the comparison image. In FIG. 12C, the difference arrangement 171 is indicated by black and white for the sake of drawing, but is highlighted in red or the like on the display 506, and displayed in a different manner from the noise as illustrated in FIG. 11C. Accordingly, the user determines whether there is an arrangement of differences or not easily.

Because detecting the arrangement of differences on the difference information, the information processing device 10 according to the present embodiment determines that the two images of FIG. 12A and FIG. 12 are not the same.

Sameness Determination Based on Total Area Difference Amounts:

FIG. 13 is a diagram illustrating a method of determining for sameness based on each total area difference amount (a total amount of differences in each of the plurality of areas). In FIG. 13, an image (a) and an image (b) are compared with each other (examples of a first image and a second image).

First, the difference information generation unit 12 performs smoothing processing on the image (a) and the image (b) illustrated in FIG. 13. This is because dots are conspicuous in a CMYK image, and a difference that is different from one perceived by human eyes (human vision system) is generated in the CMYK image. That is, the human visual perception does not compare the images dot by dot, but compares the images including dots by looking at the entire periphery of the dots. Accordingly, the difference information generation unit 12 performs the smoothing processing on a CMYK image with which dots are conspicuous. By using Gaussian smoothing for the smoothing processing, a CMYK image is converted into an RGB image.

In FIG. 13, an image (c) and an image (d) are the RGB images generated by Gaussian smoothing. Comparing an enlarged area 201-1 in the image (a) illustrated in FIG. 13 and an enlarged area 201-2 in the image (c) illustrated in FIG. 13, the dots are more smoothed in the image (c). Comparing an enlarged area 202-1 in the image (b) illustrated in FIG. 13 and an enlarged area 202-2 in the image (d) illustrated in FIG. 13, the dots are more smoothed in the image (d).

The difference information generation unit 12 generates difference information related to the image (c) and the image (d) illustrated in FIG. 13. Each of the image (c) and the image (d) illustrated in FIG. 13 is an RGB image that has a range of pixel value from 0 to 255 (an example of second value range), for example. When a pixel value of the image (d), which is an RGB image and illustrated in FIG. 13, is subtracted from a corresponding pixel value of the image (c), which is an RGB image and illustrated in FIG. 13, difference information in which a difference having a value range of −255 to 255 (an example of first value range) for each of Red, Green, and Blue may occur for each pixel is obtained.

In calculating each total area difference amount, since a negative value cancels out a positive value, the difference information generation unit 12 maps the value range of −255 to 255 to the value range of 0 to 255 in the difference information. The difference information generation unit 12 performs mapping as follows, for example:

−255 and −254 to 0
−253 and −252 to 1
−1 and 0 to 127
1 to 128
2 and 3 to 129
254 and 255 to 255

Accordingly, an original difference of 0 corresponds to 127, and 127 in the mapped image indicates no difference. A difference file (e) illustrated in FIG. 13 indicates the difference information after the mapping. The difference information (e) illustrated in FIG. 13 is represented with gray in whole, and this indicates that there is no difference in arrangement between the two images. Note that, in order to fully use the 8-bit scale, the difference information generation unit 12 according to the present embodiment performs mapping in the value range of 0 to 255. In some embodiments, a value range of 0 to 127 or a value range of 0 to 511 may be used.

Then, the area difference detection unit 17 calculates a total value of the pixel values included in an area 210 for each of Red, Green, and Blue. The area difference detection unit 17 shifts, or moves, the area 210 in the right direction pixel by pixel, and at each time of movement, calculates for the total value in the same manner as described above. When the area 210 reaches the right end, the area difference detection unit 17 shifts, or moves the area 210 downward by one pixel row, returns to the left end, and then performs scanning in the right direction.

Then, the area difference detection unit 17 compares the total value for each of Red, Green, and Blue with the threshold value that varies between Red, Green, and Blue, for each area 210, and records in relation to the area 210 in which the total value being equal to or greater than the threshold value is obtained. Accordingly, coordinates of an area having a difference corresponding to the area 210 are obtained. The area difference detection unit 17 records for positions corresponding to the area 210 whose total value is equal to or greater than the threshold value for each of Red, Green, and Blue.

In FIG. 13, image data (f) on which an area of which the total value is equal to or greater than the threshold value is indicated and emphasized in black. In the image data (f) illustrated in FIG. 13, the areas 210 that has the total value equal to or greater than the threshold value for Red, the areas 210 that has the total value equal to or greater than the threshold value for Green, and the areas 210 that has the total value equal to or greater than the threshold value for Blue are combined. This allows the user to specify an area that has a difference easily.

Figure 14:
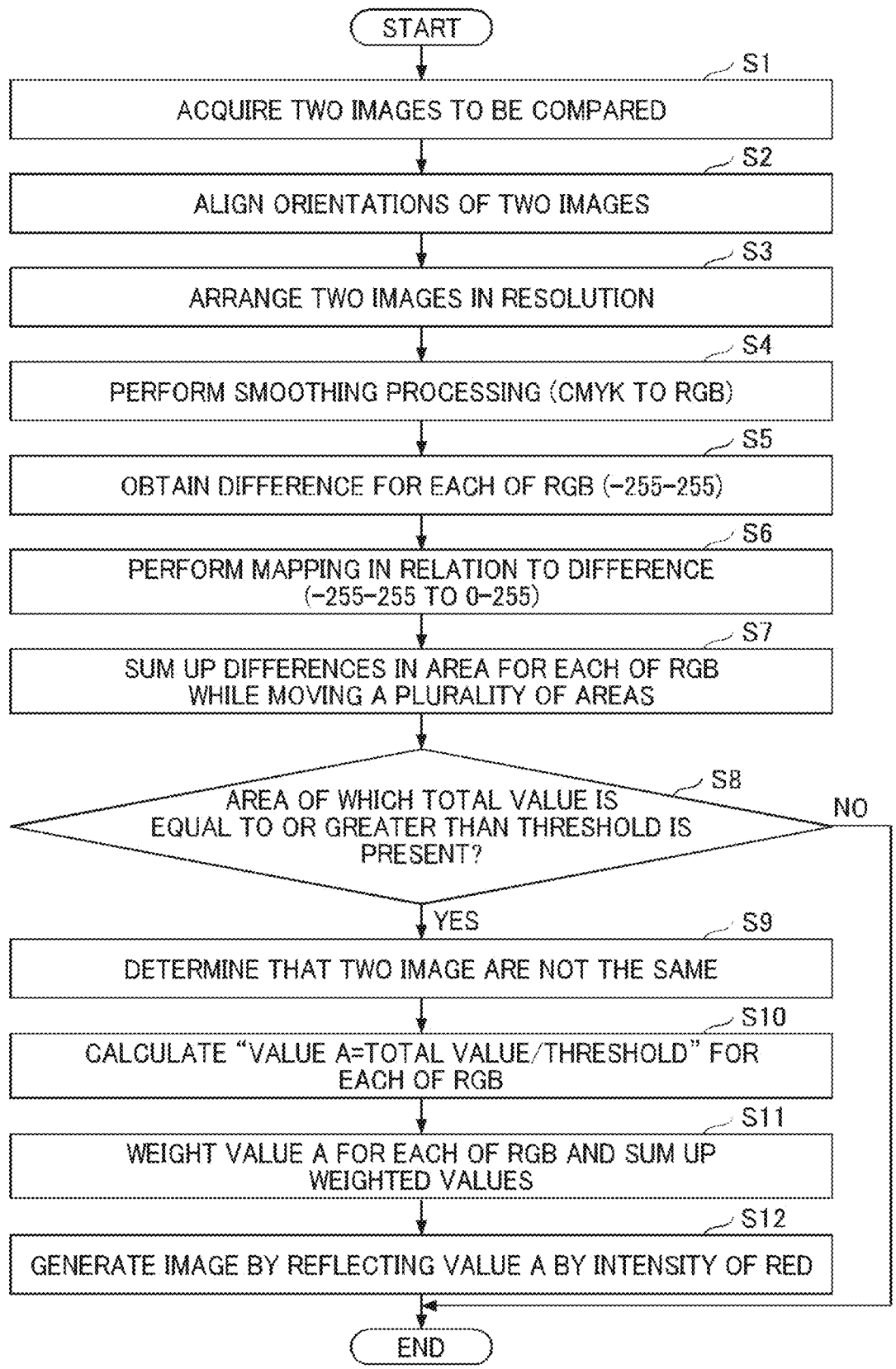
FIG. 14 is a flowchart illustrating an example of a process of determining whether two images are the same with each other based on one or more total area difference amounts, performed by the information processing device, according to the exemplary embodiment of the present disclosure.

Sameness Determination Process Based on Total Area Difference Amount:

FIG. 14 is a flowchart illustrating an example of a process of determining whether two images are the same with each other based on each total area difference amount, performed by the information processing device 10 according to the present embodiment of the disclosure. Hereinafter, the process may be referred to as a sameness determination process, in the description of the present embodiment.

First, the image acquisition unit 11 acquires two images to be compared from the image data storage unit 21 (Step S1).

The difference information generation unit 12 aligns the orientations of the two images (Step S2). For example, assuming that a vertical size is H, and a horizontal size is W, the difference information generation unit 12 aligns the orientations of the two images so dial each ratio between the vertical and horizontal directions of corresponding images is H:W. The orientation of the comparison image may be changed, or the orientation of the reference image may be changed.

Further, the difference information generation unit 12 arranges the two images in resolution (Step S3). That is, the difference information generation unit 12 arranges the two images in size. A difference information generation unit 12 reduces or enlarges the comparison image in accordance with the reference image. With the processing of steps S2 and S3, an accurate comparison of the two images is to be performed.

Next, the difference information generation unit 12 performs the smoothing processing on the two images by Gaussian smoothing or the like (S4). As a result, the CMYKs image are converted into the RGB images. An averaging filter or a median filter may be used for the smoothing processing.

The difference information generation unit 12 calculates a difference of pixel value for each of Red, Green, and Blue (Step S5). When 8 bits is used in relation to RGB, a value of difference is in the value range of –255 to 255.

The difference information generation unit 12 maps, in relation to the difference, from the value range of –255 to 255 to the value range of 0 to 255 (Step S6). The mapping may be conversion of a negative value to a positive value, and the value range to be mapped is not limited to the value range of 0 to 255.

Next, for each of Red, Green, and Blue, the area difference detection unit 17 calculates the total area difference amount by summing up the differences within each area while moving the plurality of areas corresponding to the difference information (Step S7).

Then, the second determination unit 18 determines whether there is an area of which the total area difference amount for any of Red, Green, and Blue is equal to or greater than the threshold value (Step S8). The second determination unit may use the threshold value that varies between Red, Green, and Blue. This is because the sensitivity of human visual perception differs between Red, Green, and Blue. For example, the threshold value includes a first threshold value, a second threshold value, and a third threshold value corresponding to Red, Green, and Blue, respectively. More specifically, whether the total area difference amount for Red (an example of first total area difference amount) is equal to or greater than the first threshold value or not, whether the total area difference amount for Green (an example of second total area difference amount) is equal to or greater than the second threshold value or not and whether the total area difference amount for Blue (an example of third total area difference amount) is equal to or greater than the third threshold value or not are determined. Then, when one or more of the first total area difference amount, the second total area difference amount, and the third total area difference amount are equal to or greater than the corresponding one or more of the first threshold value, the second threshold value, and the third threshold value, the total area difference amount as an area is determined to be equal to or greater than the threshold value, namely the corresponding area is determined to have a difference.

When at least one of the plurality of areas has the total area difference amount that is equal to or greater than the threshold value, the second determination unit 18 determines that the two images are not the same (Step S9).

When there is an area of which the total area difference amount is equal to or greater than the threshold value, the difference amount determination unit 19 calculates "total value/threshold value" for each of Red, Green, and Blue (example of first value) (Step S10). That is, the difference amount determination unit 19 divides each of the first area difference amount, the second area difference amount, and the third area difference amount by the threshold value or the corresponding one of the first threshold value, the second threshold value, and the third threshold value to obtain the first values. A result obtained by the calculation is referred to as "values A." The larger the values A are, the larger the difference becomes.

The difference amount determination unit 19 performs weighting processing on each of the values A each of which is corresponding one of Red, Green, and Blue to obtain weighted values A (example of second values) and sums up the weighted values A in the area to obtain a difference value indicating a degree or level of the difference (Step S11). The weighting processing is performed taking into account the sensitivity of the human visual perception with respect to each of Red, Green, and Blue, namely the weighting processing may be performed according to each of Red, Green, and Blue.

In alternative to using as a difference value the value obtained by summing up the weighted values A, one of the values A (or one of the weighted values A) each of which is corresponding one of Red, Green, and Blue in the same area may be used. For example, the difference amount determination unit 19 may use as a difference value one of the values A that has the largest value (maximum value) among the values A. Alternatively, for example, the difference amount determination unit 19 may use as a difference value one of the values A corresponding to one of Red, Green, and Blue (for example, Green) by taking into account the sensitivity of human visual perception.

The display control unit 16 generates an image by reflecting the values A, for example, by setting intensity of color of red (intensity of red) according to the values A (Step S12). The display control unit 16 converts the values A into a red-based color between (0, 0, 0) to (255, 0, 0) by using, for example, a predetermined table. Due to this, the larger the values A are, a red color converted becomes deeper, or darker, namely has higher intensity. Accordingly, the user recognizes, or perceives, a difference in a manner that a degree or a level of the difference is larger in an area indicated by deeper red, or darker red, namely by red color having higher intensity.

COMPARATIVE EXAMPLE

Figure 15A:
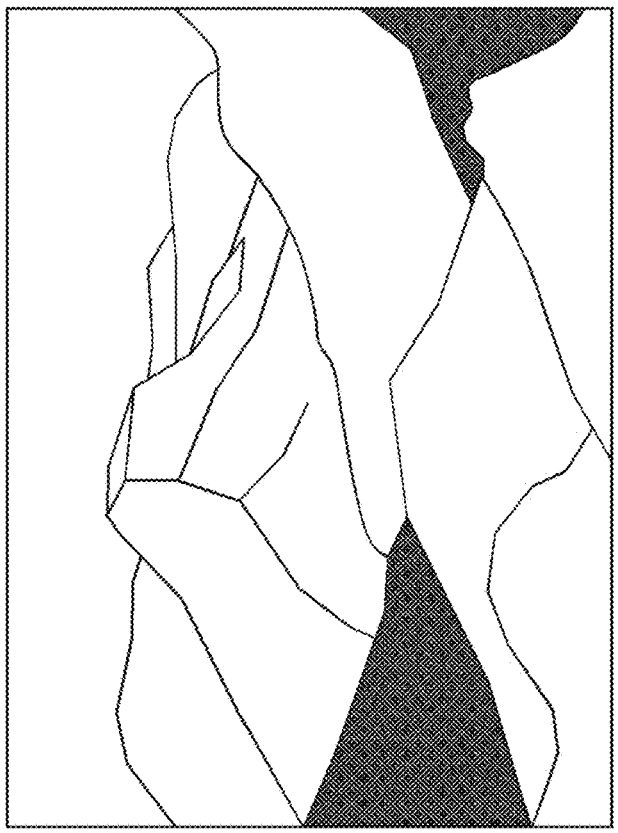
FIG. 15A and FIG. 15B are diagrams illustrating a comparative example of two images to be compared with each other, according to the exemplary embodiment of the present disclosure.
Figure 15B:
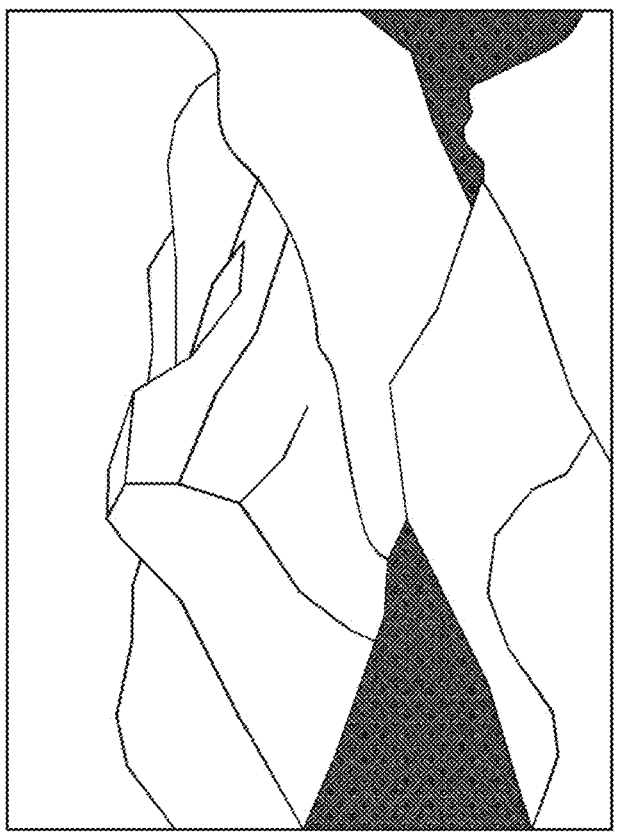
Figure 16:
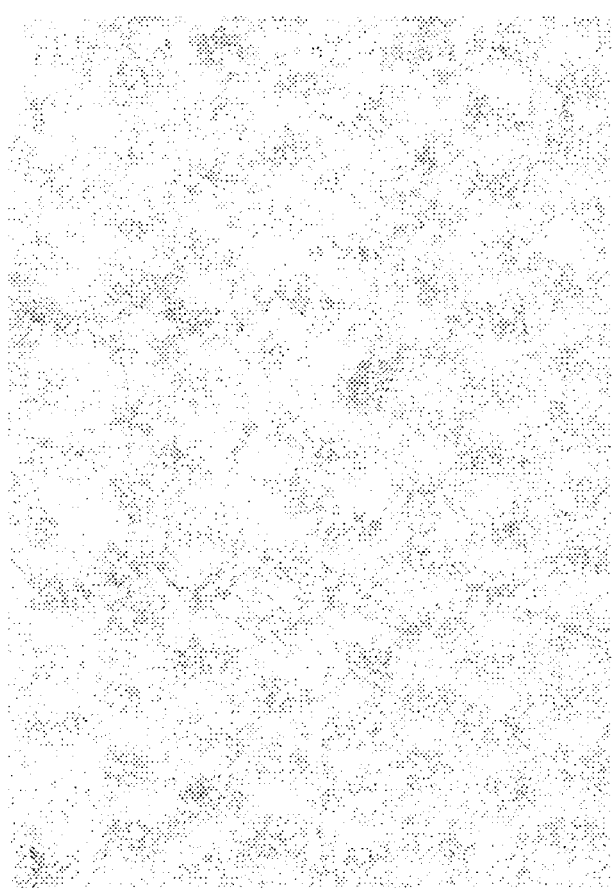
FIG. 16 is a diagram illustrating a comparative example of difference information indicated by pixel level between the two images illustrated in FIG. 15A and FIG. 15B, according to the exemplary embodiment of the present disclosure.

FIG. 15A, FIG. 15B, and FIG. 16 are diagram illustrating a comparative example of two images and difference information based on a total area difference amount, according to the present embodiment of the disclosure. FIG. 15A and FIG. 15B are diagrams illustrating two images to be compared with each other. Although these images are not strictly the same, a determination result obtained by the human visual perception indicates that there is no difference between the two images.

FIG. 16 is a diagram illustrating an example of difference information indicated by pixel level between the two images illustrated in FIG. 15A and FIG. 15B. As illustrated in FIG. 16, although there is a difference in the entire image, an area of which tire total area difference amount is equal to or greater than the threshold value is not detected. Accordingly, the information processing device 10 outputs a determination result of the sameness determination similar to a determination result made by a human.

Figure 17A:
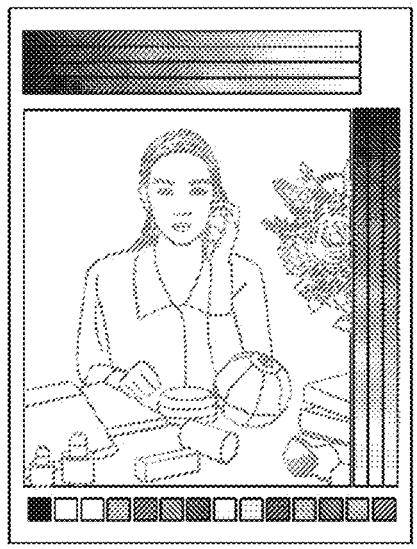
FIG. 17A and FIG. 17B are diagrams illustrating another comparative example of two images to be compared with each other according to the exemplary embodiment of the present disclosure.
Figure 17B:
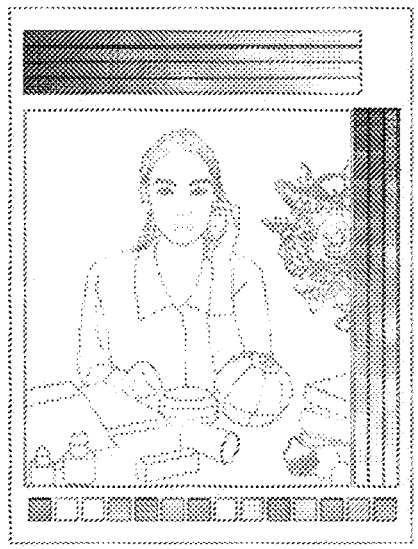
Figure 18:
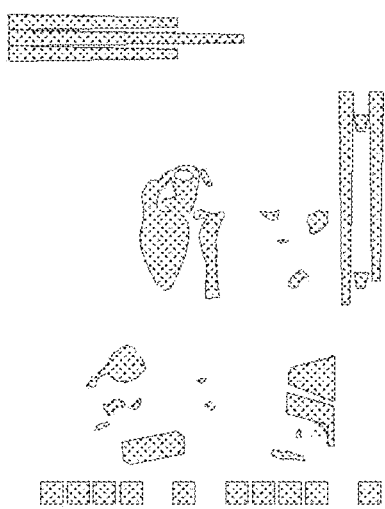
FIG. 18 is a diagram illustrating another comparative example of difference information that is an image in which a value A is reflected by using a color of red based on a total area difference amount, according to the present embodiment of the disclosure.

FIG. 17A, FIG. 17B, and FIG. 18 are diagrams illustrating another comparative example of two images and difference information based on a total area difference amount, according to the present embodiment of the disclosure FIG. 17A and FIG. 17B are diagrams illustrating two images to be compared with each other. With the human visual perception, it is determined that the two images are different from each other.

FIG. 18 is an image in which the value A is reflected by using red color based on the total area difference amount. As illustrated in FIG. 18, since an area having a difference is colored in red based on the total area difference amount and this allows the user to determine where the difference is easily.

Figure 19:
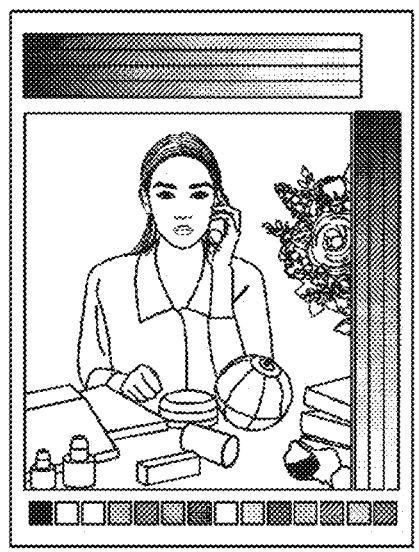
FIG. 19 is a diagram illustrating an example of an image to be compared with another image, according to the present embodiment of the disclosure.

FIG. 19 is a diagram illustrating an image, which is different from the image illustrated in FIG. 17B and to be compared with the image illustrated in FIG. 17A. A determination result made by human with respect to the comparison of the two images of FIG. 17A and FIG. 19 indicates that a degree or a level of the difference is larger than that of the comparison of the two images of FIG. 17A and FIG. 17B.

Figure 20:
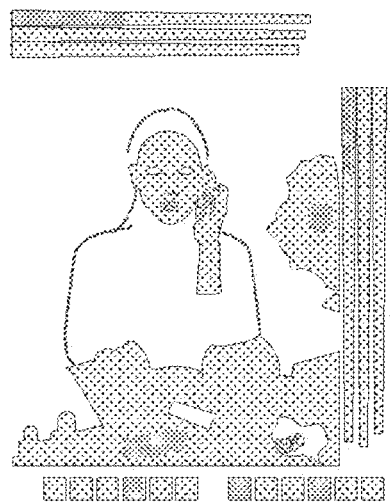
FIG. 20 is a diagram illustrating an example of an image in which a value A is reflected by using a color of red based on a total area difference amount obtained based on the two images of FIG. 17A and FIG. 19.

FIG. 20 is an image in which the value A is reflected by using a color of red based on the total area difference amount obtained based on the two images of FIG. 17A and FIG. 19. As illustrated in FIG. 20, an area having a difference is colored in red based on the total area difference amount. The red color in FIG. 20 is generally darker than that in FIG. 18.

As described above, a degree or a level of a difference is indicated by intensity of red color, and thus it is not necessary for a human to visually check the original image. Accordingly, priorities are settable, in a case where there is a large number of differences between images, after the information processing device performs the sameness determination.

As described above, an information processing device according to the present embodiment determines whether difference is perceptible with human eyes by comparing a total area difference amount in difference information to a threshold value. A determination result indicating as to whether the two images are the same or not regarding a difference in the hue or the color tone which is difficult to be detect by the arrangement of differences is obtained so that the determination result is close to a determination result obtained by human.

In a conventional determination method, in relation to determining whether two images are the same or not, a determination result may be different from a determination result made by human (human visual perception, human eyes). For example, even in a case of desiring to obtain a result indicating whether two images are perceived as the same by human or not, the images are determined not to be the same with each other due to a slight difference detected by image processing.

In addition, for example, when an image such as a photograph (a complicated image), there is a case in which a determination result different from a determination result obtained by human visual perception is obtained as to whether hues, or color tone, of the two images are the same or not.

According to an embodiment of present disclosure, an information processing device, a determination method, a program or the like that determines whether two images are the same or not and obtains a determination result that is close to a determination result obtained by human visual perception is provided.

Variation.

The above-described embodiment is illustrative and does not limit the present disclosure. Thus, numerous additional modifications and variations are possible in light of the above teachings within the scope of the present disclosure. Any one of the above-described operations may be performed in various other ways, for example, in an order different from the one described above.

For example, the functional configuration illustrated in FIG. 4 is divided according to main functions in order to facilitate understanding of processing performed by the information processing device 10. Each processing unit or each specific name of the processing unit is not to limit a scope of the present disclosure. The processing of the information processing device 10 may be divided into more processing units according to the details of processing. Also, one processing unit may be divided so as to include more processes.

Each of the functions of the described embodiments may be implemented by one or more processing circuits or circuitry. Here, the "processing circuit or circuitry" in the present disclosure includes a programmed processor to execute each function by software, such as a processor implemented by an electronic circuit, and devices, such as an Application Specific Integrated Circuit (ASIC), a Digital Signal Processors (DSP), a Field Programmable Gate Array (FPGA), and conventional circuit modules arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and or substituted for each other within the scope of the present invention.

Any one of the above-described operations may be performed in various other ways, for example, in an order different from the one described above.

The invention claimed is:

1. An information processing device, comprising circuitry configured to:

generate difference information related to a difference between a first image and a second image, the difference information having a plurality of areas;
obtain, in a sequential order with respect to the plurality of areas of the difference information, a total value of differences in each of the plurality of areas as one of a plurality of total area difference amounts;
determine whether the first image is the same as the second image, as perceptible by a human eye, based on each of the plurality of total area difference amounts;
divide the plurality of total difference amounts by a threshold value to obtain a difference value for a corresponding one of the plurality of areas;
set, based on the difference value, an intensity of color of the corresponding one of the plurality of areas; and
generate a difference image based on each of the plurality of total area difference amounts in response to determining that the first image is not the same as the second image.

2. The information processing device of claim 1, wherein the circuitry is further configured to:
obtain the plurality of total area difference amounts in a sequential order with respect to the plurality of areas of the difference information; and
determine that the first image is different from the second image in response to determining that at least one of the plurality of total area difference amounts is equal to or greater than a threshold value.

3. The information processing device of claim 2, wherein the difference information is based on Red, Green, and Blue,
the each of the plurality of total area difference amounts includes a first total area difference amount, a second total area difference amount, and a third total area difference amount corresponding to the Red, the Green, and the Blue, respectively,
the threshold value includes a first threshold value, a second threshold value, and a third threshold value that are corresponding to the Red, the Green, and the Blue, respectively, and
the circuitry is further configured to determine that the at least one of the plurality of total area difference amounts is equal to or greater than the threshold value in response to determining that at least one of the first total area difference amount, the second total area difference amount, or a third total area difference amount included in the at least one of the plurality of total area difference amounts is equal to or greater than a corresponding one of the first threshold value, the second threshold value, or the third threshold value.

4. The information processing device of claim 2, wherein the difference information is based on Red, Green, and Blue and has a first value range in relation to difference for each of the Red, the Green, and the Blue, the first value range being from −255 to 255, and
the circuitry is further configured to
perform Gaussian smoothing on the first image and the second image to convert from CMYK images into RGB images,
map the first value range to a second value range for each of the Red, the Green, and the Blue in the difference information, the second value range being from 0 to 255,
obtain, based on the difference information having the second value range, the plurality of total area difference amounts, each total area difference amount of the plurality of total area difference amounts including a first total area difference amount, a second total area difference amount, and a third total area difference amount corresponding to the Red, the Green, and the Blue, respectively, and
determine that the at least one of the plurality of total area difference amounts is equal to or greater than the threshold value, in response to determining that at least one of the first total area difference amount, the second total area difference amount, or the third total area difference amount included in the at least one of the plurality of total area difference amounts is equal to or greater than the threshold value.

5. The information processing device of claim 4, wherein the circuitry is further configured to
divide the first total area difference amount, the second total area difference amount, and the third total area difference amount by the threshold value to obtain first values each of which corresponds to one of the Red, the Green, and the Blue, respectively,
perform weighting processing on each of the first values according to a corresponding one of the Red, the Green, and the Blue, respectively, to obtain second values each of which corresponding to one of the Red, the Green, and the Blue, respectively,
obtain a total value of the second values as a difference value for a corresponding one of the plurality of areas, and
set, based on the difference value, an intensity of color of the corresponding one of the plurality of areas.

6. The information processing device of claim 4, wherein the circuitry is further configured to:
divide one of the first total area difference amount, the second total area difference amount, or the third total area difference amount by the threshold value to obtain a difference value for a corresponding one of the plurality of areas, the one of the first total area difference amount, the second total area difference amount, or the third total area difference amount having a maximum value among the first total area difference amount, the second total area difference amount, and the third total area difference amount; and
set, based on the difference value, an intensity of color of the corresponding one of the plurality of areas.

7. A determination method, comprising:
generating difference information related to a difference between a first image and a second image, the difference information having a plurality of areas;
obtaining in a sequential order with respect to the plurality of areas of the difference information, a total value of differences in each of the plurality of areas as one of a plurality of total area difference amounts; and
determining whether the first image is the same as the second image, as perceptible by a human eye, based on each of the plurality of total area difference amounts;
dividing the plurality of total difference amounts by a threshold value to obtain a difference value for a corresponding one of the plurality of areas;
setting, based on the difference value, an intensity of color of the corresponding one of the plurality of areas; and
generating a difference image based on each of the plurality of total area difference amounts in response to determining that the first image is not the same as the second image.

8. The determination method of claim 7, wherein a difference between the first image and the second image is highlighted in the difference image.

9. A non-transitory recording medium storing a plurality of instructions which, when executed by one or more processors, causes the processors to perform a method, the method comprising:
    generating difference information related to a difference between a first image and a second image, the difference information having a plurality of areas;
    obtaining, in a sequential order with respect to the plurality of areas of the difference in formation, a total value of differences in each of the plurality of areas as one of a plurality of total area difference amounts;
    determining whether the first image is the same as the second image, as perceptible by a human eye, based on each of the plurality of total area difference amounts;
    dividing the plurality of total area difference amounts by a threshold value to obtain a difference value for a corresponding one of the plurality of areas
    setting, based on the difference value, an intensity of color of the corresponding one of the plurality of areas; and
    generating a difference image based on each of the plurality of total area difference amounts in response to determining that the first image is not the same as the second image.

10. The information processing device of claim 1, wherein a difference between the first image and the second image is highlighted in the difference image.

11. The non-transitory recording medium of claim 9, wherein a difference between the first image and the second image is highlighted in the difference image.

\* \* \* \* \*